June 4, 1929.  H. L. MASON  1,715,665

VALVE FOR STEAM OR OTHER FLUIDS AND LIQUIDS

Filed Nov. 6, 1926

Inventor
HAROLD LYALL MASON,
By Toulmin & Toulmin
Attorneys

Patented June 4, 1929.

1,715,665

UNITED STATES PATENT OFFICE.

HAROLD LYALL MASON, OF LONDON, ENGLAND.

VALVE FOR STEAM OR OTHER FLUIDS AND LIQUIDS.

Application filed November 6, 1926, Serial No. 146,774, and in Great Britain November 10, 1925.

This invention relates to valves for steam or other fluids and liquids of the type comprising a solid or imperforate piston as the valve proper with a co-axial operating spindle, and necessitating the provision of elastic packing whose degree of compression is capable of variation or adjustment, and it is particularly directed to that known kind wherein the fluid or liquid passage is controlled by a piston assembled in a cylindrical boring of the valve casing, and packed by elastic rings inserted in the boring in spaced relation.

My object is to provide an improved valve of this kind, and to this end the invention is characterized in that the complete packing is constituted and assembled as a plurality of independently adjustable units consisting of a simple structure in the form of a single elastic ring or element, or a compound structure comprising a pair of elastic rings or elements and an associated interposed rigid annular or other member.

A valve embodying the invention may include two or more of the packing units which may be of the same type, or of different types, that is to say, there may be incorporated in one valve a simple unit or units and a compound unit or units, or two or more simple units, or two or more compound units.

It is convenient to point out here that valves of the piston variety are known in which the packing is composed of U-shaped rings of flexible material and interposed rigid members in the form of spacer tubes or the like and relying upon the pressure of the fluid or liquid within the valve to maintain a seal; and, further, that it has been proposed in connection with an open-ended tubular piston valve to employ two elastic packing rings spaced by a rigid lantern member and associated with a gland adapted to simultaneously adjust the rings according to one construction and to adopt, according to another construction, two separately-adjustable packings of the stuffing box and gland variety.

I will now fully describe my invention with reference to the accompanying drawings which illustrate, by way of example, two forms of it embodied in steam valves and whereof—

Figure 1:
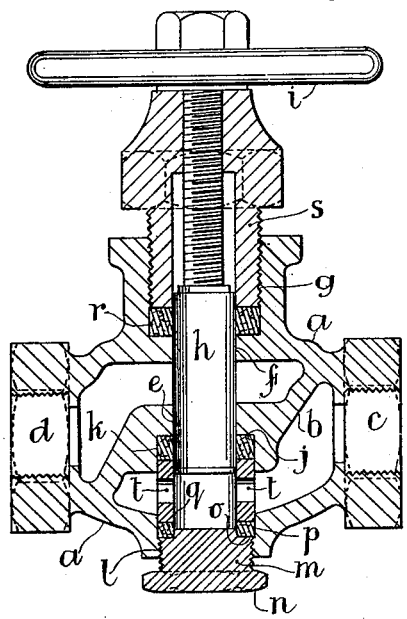
Figure 2:
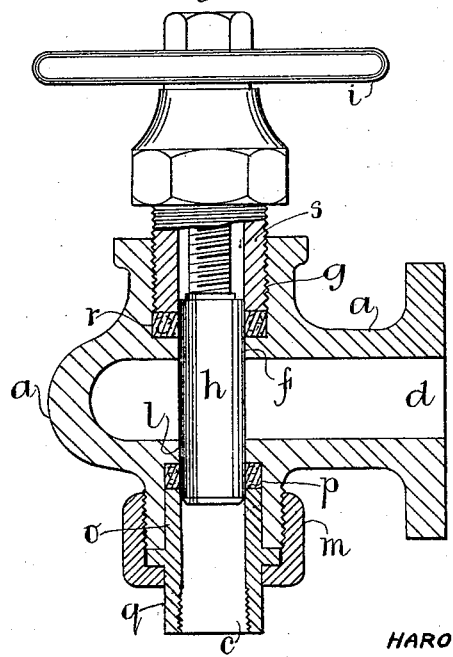

Fig. 1 is a central sectional elevation of a stop valve; and Fig. 2 is a central sectional elevation of a blow-off valve.

The same letters of reference are adapted throughout to designate the same or equivalent parts.

According to one example, illustrated in Fig. 1, which comprehends a stop valve wherein the inlet and outlet are in horizontal alignment, the valve casing $a$ is of an ordinary construction comprising a diaphragm $b$ dividing the inlet $c$ from the outlet $d$, and having a cylindrical boring $e$ in axial alinement with a boring $f$ in the top of the casing $a$ communicating with a stuffing box $g$. The piston $h$ is, as usual, solid, that is to say imperforated, and it is assembled in these borings $e$ and $f$ and adapted to be actuated as usual and as represented at $i$. The boring $e$ at the lower face of the diaphragm $b$ is enlarged so that a seat $j$ for packing $k$ obtains, and a boring $l$ in alinement with the boring $e$ is made in the bottom of the casing $a$. The latter boring $l$ is screwed for the reception of a plug $m$ furnished with a polygonal manipulating head $n$. The inner end of the plug $m$ is peripherally recessed to form a seat $o$ for packing $p$. By insertion through the bottom boring $l$, the packing ring $k$ is inserted in the seat $j$ in the diaphragm $b$; next, a rigid annular member $q$ is interposed against the ring $k$; and, finally, the plug $m$, with the packing ring $p$ positioned in its seat $o$, is screwed into the boring $l$. Consequently, the rings $k$ and $p$ and the annular member $q$ constitute a compound packing unit, the rings $k$ and $p$ being tightened or slackened on the appropriate operation of the plug $m$.

A packing ring $r$ is situated in the stuffing box $g$ at the top of the valve casing $a$, and it is tightened or slackened by a gland $s$ in the customary way, this arrangement thus comprising a simple packing unit.

The annular member $q$ of the compound packing unit is provided with ports $t$—$t$ to form a component of the steam passage. However, due to the location of this member $q$, these ports $t$—$t$ are below the diaphragm $b$ instead of above as in the known arrangement, and, therefore, they are not directly controlled by the piston $h$ which is so co-related that its extremity aligns with the under face of the diaphragm $b$ in the fully-closed position thereby only slightly entering the member as shown in the drawing, and with the inside face of the top of the valve casing in the fully-opened position.

I will now describe the example which is shown in Fig. 2 and contemplates a blow-off valve wherein the inlet c and outlet d are at right angles to each other, although the order may be reversed, that is to say d may constitute the inlet and c the outlet. The walls of the casing a are formed with a boring f in one case, and l in the other in alinement with the inlet c, and in this boring f—l a solid piston h is arranged. Concentrically with each boring f and l, the wall is fashioned with a larger boring constituting a stuffing box g and o into which is inserted a packing ring r and p. The ring r in one stuffing box g is held in position by a gland s as usual through which the piston h projects for operation in any suitable way as delineated at i. The ring p in the other stuffing box o is maintained in position by one end of an annular member q inserted in the box o and secured by a gland nut m applied to the exterior thereof. The free or outer end of the annular member q is adapted to be connected to one of the branch pipes, which, as represented, is the one communicating with the inlet c. When the piston h is fully closed its inner extremity projects slightly into the annular member q as indicated, and when fully-opened aligns with the inner face of the casing a. Thus the packing units r and p are of simple structure, and are independently tightened or slackened, one by the annular member q and complemental gland nut m, and the other by the gland s.

It will now be evident that the construction of the packing in units, coupled with their independent adjustment, presents sundry practical advantages, such as, inter alia, the use of packing rings or elements r, k and p of different kinds, or of different dimensions, or both in the one valve to meet various services and designs. Thus, for instance, the piston h may comprise a plurality of spaced elements of the same or different diameters, one or more of the elements constituting the valve proper, and the other or others a balancing agent or agents, each element being, if required, associated with a simple or compound packing unit as may be most appropriate.

Also it will be manifest that facility for access to the valve casing a is afforded by the plug m in the stop-valve example shown in Fig. 1, and by the gland nut m and annular member q in the blow-off valve example illustrated in Fig. 2.

In the examples described with reference to Figs. 1 and 2 of the drawing, I have exemplified the packing units as being adjusted axially, but, of course, the adjustment may be effected in any other known or suitable way. For instance, any single ring or element k, p or r may be adjusted radially by a screw-device or devices applied directly, or such ring or element may be of the character capable of circumferential adjustment by a tangentially-applied screw-device.

Also the packing elements k, p and r may be of any configuration to meet the shape of the piston h and the casing a. Thus, for instance, they may be oval or square internally or externally, or curvate at one face and plane at the other.

What I claim and desire to secure by Letters Patent is:—

1. Valves for fluids and liquids of the type comprising an imperforate piston as the valve proper with a co-axial operating spindle and elastic packing about the piston whose degree of compression is capable of variation or adjustment, characterized in that the complete packing is composed of a plurality of units and in that each unit is independently adjustable.

2. Valves for fluids and liquids of the kind having a solid piston as the valve proper and packing of the piston composed of a plurality of units wherein one unit is of compound structure consisting of elastic elements and a rigid annular member interposed between them, said annular member having a port through its wall between said elements, and the packing of one element differing in size from the packing of the other.

In testimony whereof, I affix my signature.

HAROLD LYALL MASON.